(12) United States Patent
Bruckner

(10) Patent No.: US 6,266,582 B1
(45) Date of Patent: Jul. 24, 2001

(54) GPS ANALYTIC REDUNDANCY FOR GYROSCOPE FAILURE DETECTION

(75) Inventor: Juergen M. Bruckner, Cedar Rapids, IA (US)

(73) Assignee: Rockwell Collins. Inc., Cedar Rapids, IA (US)

( * ) Notice: Subject to any disclaimer, the term of this patent is extended or adjusted under 35 U.S.C. 154(b) by 0 days.

(21) Appl. No.: 09/086,323

(22) Filed: May 28, 1998

Related U.S. Application Data

(63) Continuation-in-part of application No. 08/906,845, filed on Aug. 6, 1997, now abandoned.

(51) Int. Cl.⁷ .............................. G01S 5/04; H04B 7/185

(52) U.S. Cl. ...................... 701/4; 701/215; 342/357.11; 342/357.14

(58) Field of Search .................................. 701/4, 14, 213, 701/215, 220, 224, 120, 300; 342/357.03, 357.05, 357.08, 357.11, 357.12, 357.14

(56) References Cited

U.S. PATENT DOCUMENTS

| 4,913,548 | | 4/1990 | Vick | 356/350 |
|---|---|---|---|---|
| 5,101,356 | * | 3/1992 | Timothy et al. | 701/207 |
| 5,349,531 | * | 9/1994 | Sato et al. | 701/207 |
| 5,461,388 | * | 10/1995 | Applegate et al. | 342/357 |
| 5,557,284 | * | 9/1996 | Hartman | 342/357 |
| 5,572,218 | * | 11/1996 | Cohen et al. | 342/357 |
| 5,757,316 | * | 5/1998 | Buchler | 342/357 |
| 6,100,842 | * | 8/2000 | Dreier et al. | 342/357.08 |

\* cited by examiner

Primary Examiner—Tan Nguyen
(74) Attorney, Agent, or Firm—Nathan O. Jensen; Kyle Eppele; James P. O'Shaughnessy

(57) ABSTRACT

An inertial measurement system for determining the attitude and rate of change of attitude of a vehicle such as an aircraft is disclosed. Redundancy of the inertial measurement system may be accomplished by utilizing a global positioning system having three receivers and a set of antennas strategically disposed on the vehicle. The global positioning system having receivers may be utilized for accomplished failure detection and isolation of the inertial measurement system rather than providing a redundant inertial measurement system. Failure detection of the IMUs may be accomplished with only dual antenna/receiver configuration.

2 Claims, 2 Drawing Sheets

GPS ANALYTIC REDUNDANCY FOR GYROSCOPE FAILURE DETECTION

CROSS REFERENCES TO RELATED APPLICATION

This application is a continuation-in-part of "GPS Analytic Redundancy For Gyroscope Failure Detection", by Juergen Bruckner, Ser. No. 08/906,845 with a filing date of Aug. 6, 1997 abandoned.

BACKGROUND OF THE INVENTION

In recent years the aviation industry has been involved in a seemingly never ending quest to enhance the performance of modern avionics. One particular area in which avionics engineers have expended much effort and achieved many successes is in the substitution of completely electro-optical systems for the conventional mechanical systems of the past. A prime example of these efforts is in the area of inertial measurement units (IMUs).

Gyroscopes have been utilized as IMUs to provide information concerning the orientation of the airplane with respect to a reference plane, typically the ground. State of the art avionics control systems utilize solid state fiber optic ring gyroscopes (a.k.a. FOG) to provide angular rate information regarding changes in the plane's orientation. Fiber optic ring laser gyros typically have as one of their components an optical readout device for analyzing the frequency of light signals that are split off from the ring. Often this is done with a fiber optic directional coupler which is connected to an optical detector by two optical fibers. For example, U.S. Pat. No. 4,913,548 describes such a solid state fiber optic gyro which has a reduced relative size and weight and which is capable of detecting both the magnitude and direction of the angular rotation of the fiber optic gyro by comparing signal phase information.

The global positioning system (GPS) satellite navigation systems provides a worldwide position, velocity and time reference available for utilization in civilian aviation electronic navigation systems. The civilian global positioning system service has allowed accurate positioning information processing apparatuses to be incorporated into low cost consumer electronics such as avionics navigation systems. Further, the global positioning system has been approved for sole means navigation making GPS an attractive alternative to traditional avionics systems.

In avionics navigation and control systems, it is highly desirable to incorporate redundancy in order to provide integrity and control of the airplane. IMU failure detection presently comprises physical redundancy by using multiple similar sensors. However, increasing system redundancy directly increases the cost of the navigation system. Redundancy necessitates adding at least one more sensor than is required for fault free operation. Typically, it would be desirable to provide an aircraft with two or three individual attitude and heading reference systems (AHRS) to provide angular movement information in three dimensions (3D). Small aircraft customers, however, cannot afford to carry spare equipment, but still want or need a redundant reference for gyroscope fault detection and isolation.

With three attitude and reference heading systems, a failed AHRS system can be detected and isolated. With two attitude and reference heading systems, a failed AHRS system can be detected but the failed unit cannot be isolated. It is therefore desirable to provide a less costly means for failure detection and isolation.

SUMMARY OF THE INVENTION

The present invention provides utilization of a reduced number of traditional gyroscopic attitude and heading reference systems by replacing at least one of the redundant AHRS systems with existing on board dual GPS receivers with their antenna locations not in-line (coincidental) with the AHRS gyro axes of rotation.

The present invention further provides failure detection and isolation of the attitude heading and reference systems by utilization of more than two global positioning receivers with a non-planar antenna configuration with the antenna configuration not necessarily skewed from the gyro axis.

The invention additionally provides standby operation of the attitude and heading reference navigation systems and provides a sole means for attitude and heading reference information.

The present invention further provides reduction in cost and in weight of avionics navigation and inertial reference systems.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
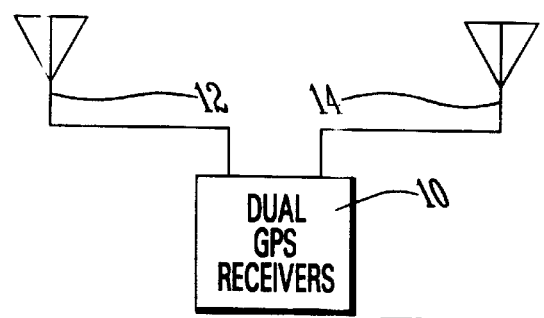
FIG. 1 shows a dual channel global positioning system receiver in accordance with the present invention.

Referring now to FIG. 1, a global positioning system having dual GPS receivers is shown in accordance with the present invention. The dual GPS receivers ("DUAL GPS RECEIVRS") 10 utilize two antennas (12, 14) as shown, one antenna for each channel. By utilization of two channels, each antenna may be mounted in strategic locations on an aircraft to provide two points of reference on the aircraft in which the present invention is utilized.

Figure 2:
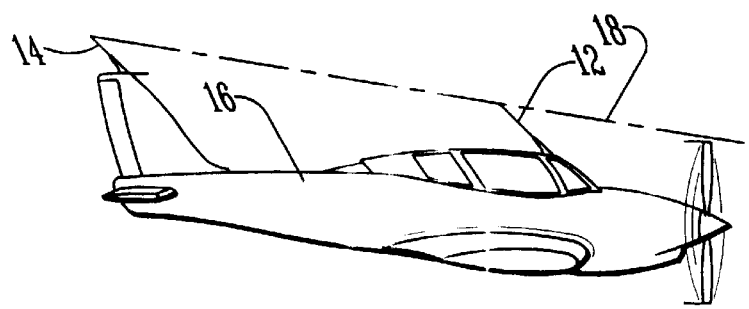
FIG. 2 shows an elevational view of an aircraft having a dual antenna installation on an aircraft in accordance with the present invention.

Referring now to FIG. 2, an elevational view of an aircraft having a dual antenna installation in accordance with the present invention is shown. A first antenna 12 may be mounted on a proximate dorsal section of the fuselage of the aircraft as shown. The second antenna 14 may be mounted on a distal dorsal section of the aircraft, for example on the tail as shown in FIG. 2. A directional axis 18 of the plane may be defined by a line passing through the effective centers of each of the antennas. The global positioning system provides coordinate information for the location of each of the antennas, therefore the attitude, and any change thereof, of the aircraft perpendicular to the antenna directional axis 18 may be determined by solving the two-point equation for the line which passes through the antenna coordinates. Determination of the rate of change of the attitude of the aircraft 16 may be determined by evaluation of the change in the coordinate positions of the antennas (12, 14) with respect to a given time reference which is also provided in the GPS signal. Thus, a dual GPS receivers system utilizing a two antenna installation may provide the same information and functionality of two axis IMUs.

Figure 3:
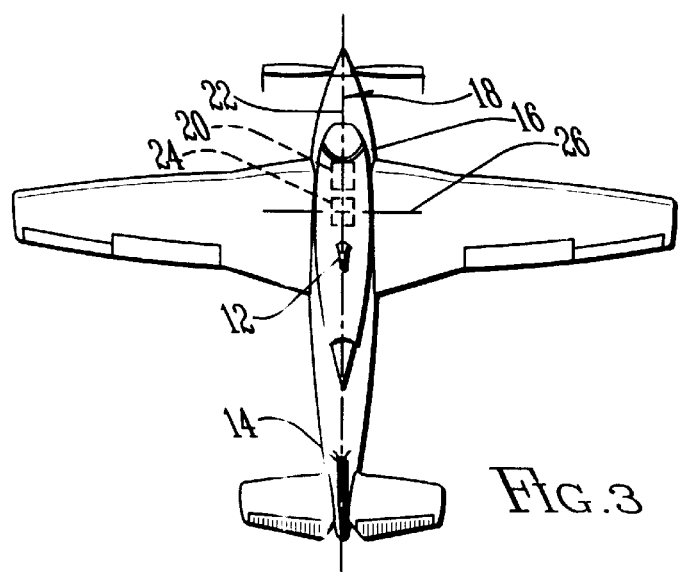
FIG. 3 shows a top plan view of the aircraft of FIG. 2.

Referring now to FIG. 3, a top plan view of the aircraft of FIG. 2 is shown. Typically, an aircraft may utilize a dual IMU (gyroscope) installation as shown wherein the first IMU 20 may provide attitude and rate of change of attitude about a first directional axis 22 (e.g., the left side of the aircraft) and a IMU 24 may provide attitude and rate of change of attitude about a second directional axis 26 as shown. In order to detect a random failure in one of the IMUs, dual systems have been installed with each system acting as a monitor of the other. However, in lower cost aircraft, dual IMU installation may be cost prohibitive. Since the global positioning system has received government approval for navigation, aircraft in current production may already include GPS navigation systems. Therefore, one of the redundant IMUs may be eliminated wherein the functionality of the eliminated IMU may be provided by existing GPS systems.

The pair of antennas (12, 14) may be mounted on the aircraft 16 as shown in FIGS. 2 and 3 to thereby form an antenna directional axis 18 which passes through the effective centers of each antenna. Thus, the redundant optic IMU may be eliminated, the functionality of which being replaced by the dual GPS receivers 10 as shown in FIG. 1 and the dual antenna (12, 14) installation. So long as the antenna directional axis 18 is non-coincidental with the directional axis of the IMUs 20 and 24, the attitude and rate of change of attitude information from the output dual GPS receivers 10 may be compared with the output of the IMUs 20 and 24.

As satellite availability of the civilian global positioning system increases, a three antenna, three GPS receiver system could be utilized not only for attitude failure detection and isolation functions but also for standby functions and finally as a sole means attitude display. For example, using three GPS receivers and three antennas strategically mounted on the aircraft, three dimensional inertial information about three orthogonal axes of the aircraft may be obtained. For example, two of the antennas (12, 14) may be disposed on the aircraft as shown in FIG. 3 with the third antenna being placed at the end of the wing 26. Thus, relative movement of the aircraft 18 with respect to antennas 12 and 14 may provide pitch and roll information, relative movement of the craft with respect to antennas 12 and 24 may provide roll and yaw information, and relative rotational movement of both antennas 14 and 20 with respect to antenna 12 may provide a combination of roll, pitch and yaw information.

The present invention may be extrapolated to utilize multiple GPS receivers and antennas to thereby provide even greater detailed inertial information of the aircraft. For example, a GPS system having five receivers and five antennas may be modified for attitude determination and for redundancy to provide failure detection and isolation. Because the global positioning system has been approved by federal authorities as a primary means navigation, the present invention may be utilized in lieu of inertial navigation systems utilizing multiple (fiber optic) gyroscopes at a lower cost since GPS navigation systems are already being presently implemented.

Thus, one AHRS unit utilized in combination with a GPS system having at least two receivers may provide failure detection of the AHRS. Two AHRS units utilized in combination with a GPS system having at least two receivers may provide isolation of a failed AHRS unit. Either method of failure detection and isolation may be accomplished when the GPS antenna axis of rotation is different from, or non-coincidental with, the axes of rotation of the AHRS gyros.

Additionally, one AHRS unit utilized in combination with a GPS system having at least three receivers with may provide failure detection. Two AHRS units utilized in combination with a GPS system having at least three receivers may provide isolation of a failed AHRS unit. For triple GPS receiver applications gyro axis of the AHRS units may be independent of the axes of the GPS antennas, and may be coincidental therewith.

Figure 4:
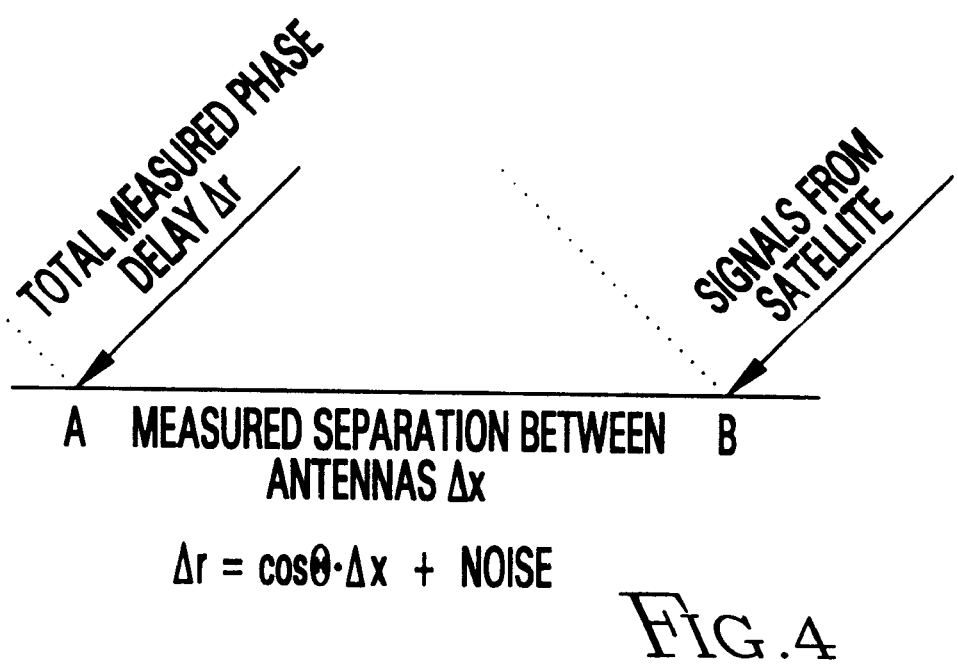
FIG. 4 illustrates a method for relating attitude and measurements in accordance with the present invention.

Referring now to FIG. 4, a method for attitude determination in accordance with the present invention is illustrated. The antennas (12, 14) of FIG. 2 may be placed on the aircraft 16 at positions A and B as shown in FIG. 4. $\Delta x$ represents the linear distance between the antennas (12, 14) which receive signals from the GPS satellite constellation. $\Delta r$ represents the difference in the measured distance in range to a satellite between points A and B. The angle $\theta$ between the antenna axis and the satellite may be determined from $\Delta x$ and $\Delta r$ to provide relative attitude information. The relative attitude information may be derived from the following equation:

$$\Delta r = \cos\theta \cdot \Delta x + noise$$

Normal GPS processing techniques yield the absolute direction of the satellite from which the relative attitude $\theta$ may be converted into an absolute attitude. Multiple satellite data may be utilized to determine three dimensional (3D) attitude information and for robustness.

It is believed that the GPS analytic redundancy for gyroscope failure detection of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An inertial measurement system for determining the attitude and rate of change of attitude of a vehicle, about an IMU directional axis of a first reference system:

a second reference system comprising a global positioning system having dual receivers for deriving two coordinate position and attitude inputs from satellite reference signals from a pair of antennas, said antennas being mounted on the vehicle along a directional axis of the vehicle, said directional axis being non-coincidental with respect to said IMU directional axis;

said second reference system providing an independent measurement of the performance of said first reference system for detecting a failure of said first reference system.

2. An inertial measurement system for determining an attitude and rate of change of attitude of a vehicle, comprising:

an inertial measurement unit mounted along a first directional axis of the vehicle for providing attitude and rate of change of attitude information of the vehicle about said first directional axis; and a reference system comprising a global positioning system having three receivers for deriving three coordinate positions and attitudes from satellite reference signals from a triplet of antennas, said antennas being mounted on the vehicle along second and third directional axes of the vehicle, said second and third axes being independent of said first directional axis;

said reference system provides an independent measurement of the performance of said inertial measurement unit for detecting failure of said inertial measurement unit.

* * * * *